US012173229B2

(12) United States Patent
Bartels et al.

(10) Patent No.: US 12,173,229 B2
(45) Date of Patent: Dec. 24, 2024

(54) HALLOYSITE NANOTUBES FOR SLOW RELEASE ASPHALTENE CONTROL CHEMICAL SQUEEZE TREATMENTS

(71) Applicant: ChampionX USA Inc., Sugar Land, TX (US)

(72) Inventors: Jeremy Wayne Bartels, Sugar Land, TX (US); Christopher Alexander Russell, Sugar Land, TX (US); Duy T. Nguyen, Richmond, TX (US); Rebecca Michele Lucente-Schultz, Missouri City, TX (US)

(73) Assignee: ChampionX LLC, Sugar Land, TX (US)

( * ) Notice: Subject to any disclaimer, the term of this patent is extended or adjusted under 35 U.S.C. 154(b) by 0 days.

(21) Appl. No.: 18/262,005

(22) PCT Filed: Dec. 21, 2021

(86) PCT No.: PCT/US2021/064550
§ 371 (c)(1),
(2) Date: Jul. 18, 2023

(87) PCT Pub. No.: WO2022/173510
PCT Pub. Date: Aug. 18, 2022

(65) Prior Publication Data
US 2024/0101889 A1    Mar. 28, 2024

Related U.S. Application Data

(60) Provisional application No. 63/148,034, filed on Feb. 10, 2021.

(51) Int. Cl.
*C09K 8/524*    (2006.01)

(52) U.S. Cl.
CPC .......... *C09K 8/524* (2013.01); *C09K 2208/10* (2013.01)

(58) Field of Classification Search
None
See application file for complete search history.

(56) References Cited

U.S. PATENT DOCUMENTS 8,822,386 B2    9/2014  Quintero et al.
9,068,109 B2    6/2015  Rana et al.
(Continued)

FOREIGN PATENT DOCUMENTS

WO    2000052301 A1    9/2000
WO    2012009128 A2    1/2012
(Continued)

OTHER PUBLICATIONS

Abdullayev, Elshard (2010). Dissertation. 400. https://digitalcommons.latech.edu/dissertations/400.
(Continued)

*Primary Examiner* — John J Figueroa
(74) *Attorney, Agent, or Firm* — Eric D. Babych; Barnes & Thornburg LLP (57) ABSTRACT

The present disclosure provides methods and compositions for controlling asphaltenes in a subterranean formation. The compositions may include a halloysite nanotube. The nanotube has a lumen and a polymer, along with a charged surfactant, may be disposed in the lumen. A wax may be disposed on the nanotube. The wax may be disposed at either or both ends of the nanotube, thereby temporarily preventing the polymer and charged surfactant from leaving the lumen.

20 Claims, 3 Drawing Sheets

(56) References Cited

U.S. PATENT DOCUMENTS

| | | | |
|---|---|---|---|
| 11,312,895 B2 | 4/2022 | Nguyen et al. | |
| 2012/0015852 A1* | 1/2012 | Quintero | C09K 8/528 507/119 |
| 2014/0349894 A1* | 11/2014 | Quintero | C09K 8/524 507/131 |
| 2020/0102513 A1 | 4/2020 | Gul et al. | |
| 2021/0087460 A1* | 3/2021 | Shen | C09K 8/685 |

FOREIGN PATENT DOCUMENTS

| | | |
|---|---|---|
| WO | 2018022070 A1 | 2/2018 |
| WO | 2019099022 A1 | 5/2019 |
| WO | 2020252454 A1 | 12/2020 |
| WO | 2020257747 A1 | 12/2020 |

OTHER PUBLICATIONS

Cavallaro et al., "Structure of Hybrid Materials Based on Halloysite Nanotubes Filled with Anionic Surfactants", J. Phys. Chem., vol. 120 (25), pp. 13492-13502 (2016).

Dong, Jiannan et al. "Modified montmorillonite clay microparticles for stable oil-in-seawater emulsions." ACS applied materials & interfaces vol. 6,14 (2014): 11502-13. doi:10.1021/am502187t.

Farinmade, Azeem, et al. 'Targeted and Stimulus-Responsive Delivery of Surfactant to the Oil-Water Interface for Applications in Oil Spill Remediation'. ACS Applied Materials & Interfaces, vol. 12, No. 1, American Chemical Society, Jan. 2020, pp. 1840-1849, https://doi.org10.1021/acsami.9b17254.

International Search Report and Written Opinion for International Application No. PCT/US2021/064550, mailed Apr. 12, 2022, 9 pages.

Khunova, Viera, et al. 'The Effect of Halloysite Modification Combined with in Situ Matrix Modifications on the Structure and Properties of Polypropylene/Halloysite Nanocomposites'. Express Polymer Letters, vol. 7, 05 2013, pp. 471-479, https://doi.org10.3144/expresspolymlett.2013.43.

Nyankson et al, "Surfactant-Loaded Halloysite Clay Nanotube Dispersants for Crude Oil Spill Remediation", Industrial and Engineering Chemistry Research, vol. 54, No. 38, pp. 9328-9341 (2015).

Ojo et al., "A Nanocomposite of Halloysite/Surfactant/Wax to Inhibit Surfactant Adsorption onto Reservoir Rock Surfaces for Improved Oil Recovery", American Chemical Society, Energy & Fuels, 11 pages (2020).

Ojo, Olakunle Francis, et al. 'A Nanocomposite of Halloysite/Surfactant/Wax to Inhibit Surfactant Adsorption onto Reservoir Rock Surfaces for Improved Oil Recovery'. Energy & Fuels, vol. 34, No. 7, American Chemical Society, Jul. 2020, pp. 8074-8084, https://doi.org10.1021/acs.energyfuels.0c00853.

Owoseni, Olasehinde et al. "Release of surfactant cargo from interfacially-active halloysite clay nanotubes for oil spill remediation." Langmuir : the ACS journal of surfaces and colloids vol. 30,45 (2014): 13533-41. doi:10.1021/la503687b.

Owoseni, Olasehinde et al. "Tuning the Wettability of Halloysite Clay Nanotubes by Surface Carbonization for Optimal Emulsion Stabilization." Langmuir : the ACS journal of surfaces and colloids vol. 31,51 (2015): 13700-7. doi: 10.1021/acs.langmuir.5b03878.

* cited by examiner

HALLOYSITE NANOTUBES FOR SLOW RELEASE ASPHALTENE CONTROL CHEMICAL SQUEEZE TREATMENTS

TECHNICAL FIELD

The present disclosure generally relates to compositions and methods for controlling asphaltenes. More particularly, the disclosure relates to asphaltene inhibitor compositions comprising halloysite nanotubes (HNT), surfactants, and polymers.

BACKGROUND

Crude oils comprise two major solubility fractions. Maltenes constitute the fraction of oil that is soluble in low molecular mass n-alkane solvents, such as n-pentane, n-hexane and n-heptane. Asphaltenes are defined as the crude oil fraction that is soluble in aromatic solvents and insoluble in low-boiling straight chain alkanes. Asphaltene molecules have complex structures and are typically polar molecules with relatively high molecular weights (approximately 700 to 1,000 g/mol). Asphaltenes can contain carbon, hydrogen, nitrogen, oxygen, and sulfur, as well as trace amounts of transition metals, such as vanadium and nickel.

Asphaltenes are typically stable under virgin reservoir conditions but can destabilize and precipitate from crude oil during production due to changes in temperature, pressure, chemical composition, and/or shear rate. Asphaltene deposits can occur throughout the production system, from inside the reservoir formation to pumps, tubing, wellheads, safety valves, flow lines, and surface facilities used in the extraction process. Asphaltene deposits can cause production rate decline and other operational problems, such as increased fluid viscosity and density, and stabilization of oil-water emulsions. The nature of asphaltene deposits is determined by the composition of the crude oil and the conditions under which precipitation occurred.

Chemical treatment with additives, such as dispersants or inhibitors, is one of the most commonly adopted control options for the remediation and prevention of asphaltene deposition. Asphaltene inhibitors provide real inhibition in that they can shift asphaltene flocculation pressure and prevent aggregation of asphaltene molecules.

However, it may prove difficult to release the asphaltene inhibitors into the reservoir over a sustained period of time due to ineffective interaction between asphaltene inhibitors and reservoir rock. As a result, treatments must repeatedly, or even continuously, be undertaken to ensure that the requisite level of asphaltene inhibitor is continuously present.

Squeeze treatments are methods used in the oilfield to deliver chemicals to the reservoir. An asphaltene inhibitor squeeze treatment typically includes three steps. The first step, commonly referred to as the "preflush," prepares the wellbore and reservoir for the treatment. The second step, which may be referred to as the "main pill," adds the asphaltene inhibitor to the reservoir. The third step, commonly referred to as the "overflush," distributes the asphaltene inhibitor over a larger volume of the reservoir.

A squeeze treatment lifetime is the period of time after which a squeeze treatment must be repeated and relates to how quickly the asphaltene inhibitors are removed from the reservoir during production. Squeeze lifetimes are dependent on a number of factors, such as reservoir temperature, brine composition, reservoir mineralogy, and asphaltene inhibitor chemistry. In an attempt to reduce the number of squeeze treatments in a given well, and thereby simplify the logistics and improve the economics of the treatment, modifications to the treatment procedures have been developed that are targeted at extending squeeze lifetimes. These modifications, while offering a degree of squeeze life enhancement, are not without their drawbacks.

BRIEF SUMMARY

The present disclosure provides methods and compositions for controlling asphaltenes. In some embodiments, a method of controlling asphaltenes comprises adding an asphaltene inhibitor to a subterranean formation, wherein the asphaltene inhibitor comprises a HNT, the HNT comprising a lumen, wherein the lumen of the HNT comprises a polymer and a charged surfactant, the charged surfactant comprising an amine and/or amide group.

In some embodiments, the charged surfactant comprises a weight average molecular weight ranging from about 100 Da to about 1,000 Da.

In certain embodiments, the charged surfactant comprises an imidazoline or an imidazolinium.

In some embodiments, the charged surfactant comprises a member selected from the group consisting of diethylene triamine (DETA)/tall oil fatty acid (TOFA)-imidazoline, DETA/TOFA-imidazoline acrylate, DETA/TOFA-imidazolinium, DETA/TOFA-imidazolinium acrylate, and any combination thereof. In some embodiments, the charged surfactant comprises a member selected from the group consisting of and any combination thereof.

In certain embodiments, the charged surfactant is non-polymeric. The charged surfactant may be an anionic surfactant, a cationic surfactant, an amphoteric surfactant, a zwitterionic surfactant, or any combination thereof.

In some embodiments, the polymer is nonionic. The polymer may comprise a weight average molecular weight ranging from about 500 Da to about 500,000 Da. The polymer may comprise a monomer selected from the group consisting of isobutylene, butadiene, isoprene, ethylene, propylene, an acrylate, acrylamide, methacrylate, methacrylamide, and any combination thereof.

In some embodiments, the polymer is an alkyl phenol-formaldehyde polymer, an alkyl phenol-amine-formaldehyde polymer, a polyalkylene, a polyisobutylene succinic ester or a polyisobutylene succinimide. In certain embodiments, the polymer comprises about 10 mole % to about 90 mole % of a nonylphenol and about 10 mole % to about 90 mole % of formaldehyde. In some embodiments, the polymer is a polyisobutylene succinic anhydride pentaerythritol ester, a dinonylphenol-formaldehyde-nonylphenol polymer, or a 4-nonylphenol-formaldehyde-diethylenetriamine.

The present disclosure also provides compositions for controlling asphaltenes. In some embodiments, a composition comprises a HNT having an outer surface and an inner surface defining a lumen, the lumen comprising a first end and a second end. A surfactant is disposed within the lumen and the surfactant is a charged surfactant comprising an amine and/or amide group. A polymer is also disposed within the lumen.

In some embodiments, the lumen consists of, or consists essentially of, the surfactant and the polymer.

In some embodiments, the charged surfactant comprises a weight average molecular weight ranging from about 100 Da to about 1,000 Da. In certain embodiments, the charged surfactant comprises an imidazoline or an imidazolinium. In some embodiments, the charged surfactant comprises a member selected from the group consisting of diethylene triamine (DETA)/tall oil fatty acid (TOFA)-imidazoline, DETA/TOFA-imidazoline acrylate, DETA/TOFA-imidazolinium, DETA/TOFA-imidazolinium acrylate, and any combination thereof. In certain embodiments, the charged surfactant comprises a member selected from the group consisting of and any combination thereof. In certain embodiments, the charged surfactant is nonpolymeric. In some embodiments, the charged surfactant is an anionic surfactant, a cationic surfactant, an amphoteric surfactant, a zwitterionic surfactant, or any combination thereof.

The polymer disposed in the lumen may be nonionic and may comprise a weight average molecular weight ranging from about 500 Da to about 500,000 Da. In some embodiments, the polymer comprises a monomer selected from the group consisting of isobutylene, butadiene, isoprene, ethylene, propylene, an acrylate, acrylamide, methacrylate, methacrylamide, and any combination thereof. In certain embodiments, the polymer is an alkyl phenol-formaldehyde polymer, an alkyl phenol-amine-formaldehyde polymer, a polyalkylene, a polyisobutylene succinic ester or a polyisobutylene succinimide.

In some embodiments, the polymer comprises about 10 mole % to about 90 mole % of a nonylphenol and about 10 mole % to about 90 mole % of formaldehyde. In certain embodiments, the polymer is a polyisobutylene succinic anhydride pentaerythritol ester, a dinonylphenol-formaldehyde-nonylphenol polymer, or a 4-nonylphenol-formaldehyde-diethylenetriamine.

In some embodiments, a wax is disposed on at least a portion of the outer surface of the nanotube. The wax may cover at least a portion of the opening at the first end and/or at the second end. The wax may seal one or both of the first and second ends, thereby preventing the polymer and surfactant from leaving the lumen until the wax is removed.

Additional methods of controlling asphaltenes in subterranean formations are provided by the present disclosure. In some embodiments, the methods comprise preflushing the subterranean formation with an aqueous solution. The aqueous solution may comprise brine or seawater, for example. The methods may also comprise a step of delivering an asphaltene inhibitor to a wellbore of the subterranean formation. This step may be carried out with the main pill step of a squeeze treatment. The asphaltene inhibitor comprises a HNT, the HNT comprising a lumen including a polymer and a charged surfactant. The methods may further comprise a step of transporting the asphaltene inhibitor to a surface within the subterranean formation. This step may be carried out, for example, in connection with an overflush step of a squeeze treatment.

In some embodiments, the aqueous solution comprises the asphaltene inhibitor but the asphaltene inhibitor may be added during any or all steps of the method.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION

Various embodiments are described below. The relationship and functioning of the various elements of the embodiments may be better understood by reference to the following detailed description. However, embodiments are not limited to those explicitly described and exemplified.

Unless otherwise defined, all technical and scientific terms used herein have the same meaning as commonly understood by one of ordinary skill in the art. In case of conflict, the present document will control. Preferred methods and materials are described herein although methods and materials similar or equivalent to those described herein can be used in practice or testing of embodiments of the present disclosure. The materials, methods, and examples disclosed herein are illustrative only and not intended to be limiting.

The asphaltene inhibitor compositions provided herein can be used in methods for dispersing, controlling, and/or inhibiting formation of asphaltenes in an asphaltene-containing sample, such as a hydrocarbon (e.g., crude oil). The compositions can also prevent asphaltene deposition. Asphaltene deposition can occur onto any surface involved in the production, extraction and/or refinement of crude oil. For example, the surface can comprise a formation, a pump, a tube, a wellhead, a valve (e.g., safety valve), a flow line, and/or a surface facility used in extraction.

Asphaltene precipitation can be caused by a number of factors including changes in pressure, temperature and composition. Frequently, asphaltene precipitation is induced when pressures inside the reservoir decrease. Other processes that can induce precipitation in the near wellbore region include drilling, completion, acid stimulation, and hydraulic fracturing activities.

The methods, compounds, and compositions provided herein are useful for extending the lifetime of an asphaltene inhibitor treatment in a subterranean formation. In some embodiments, an asphaltene inhibitor composition is provided. The composition may comprise a HNT having an outer surface and an inner surface defining a lumen. The lumen comprises a first end and a second end. The lumen also comprises certain components, such as a surfactant and a polymer. The surfactant is a charged surfactant comprising an amine and/or amide group. The HNT may comprise a wax layer on at least a portion of an exterior surface of the HNT. In some embodiments, the first end and/or the second end of the lumen comprises wax.

The HNT may function as a nano-vessel for the asphaltene control chemicals and can be squeezed into subterranean formations. The HNT may be immobilized in the rock and slowly release the asphaltene control chemicals.

In accordance with the present disclosure, the term "asphaltene inhibitor" or "asphaltene inhibitor composition" contemplates a HNT comprising a polymer and a charged surfactant in the lumen of the HNT. In some embodiments, the asphaltene inhibitor may include other additives and/or wax.

A nanotube is a discrete particulate structure having a hollow cylindrical morphology with a cylinder outer diameter of about 1 micron or less and a ratio of length to outer diameter of about 10 to about 10,000. The nanotube structure includes an outer surface defining an outer diameter and an inner surface defining an inner diameter. The inner and outer surfaces define a length having first and second ends, the inner surface further defining a lumen extending between the first and second ends.

Halloysite ($Al_2Si_2O_5(OH)_4 \cdot 2H_2O$) is a layered aluminosilicate nanotube that is chemically similar to kaolin. Generally, the nanotubes are bilayered or have a multiple bilayer structure. Bilayer structures are formed by neighboring alumina and silica layers. The nanotubes may have different chemistries on the inner and outer surfaces thereof. Since they are natural materials, halloysite particle dimensions are variable. Generally, the length of a halloysite nanotube cylinder is about 10 nanometers (nm) to about 10 microns ($\mu$m), such as about 100 nm to about 2 $\mu$m. The inner surface diameter (defining the lumen diameter and the diameter of the openings at the first and second ends) is about 5 nm to about 150 nm, such as about 15 nm. Outer surface diameter is dictated by the number of bilayers, wherein one bilayer is reported by various sources to be about 7 Å thick.

The surfactant disposed in the lumen of the HNT is a charged surfactant comprising an amine and/or amide group. The charged surfactant may be, for example, an anionic surfactant, a partially negative/anionic surfactant, a cationic surfactant, a partially positive/cationic surfactant, an amphoteric surfactant, a zwitterionic surfactant, or any combination thereof. In some embodiments, the charged surfactant comprises an imidazoline or an imidazolinium.

The charged surfactant may comprise a member selected from the group consisting of diethylene triamine (DETA)/tall oil fatty acid (TOFA)-imidazoline, DETA/TOFA-imidazoline acrylate, DETA/TOFA-imidazolinium, DETA/TOFA-imidazolinium acrylate, and any combination thereof.

In some embodiments, the charged surfactant comprises a member selected from the group consisting of and any combination thereof. If necessary, an appropriate counter ion can be selected by one of ordinary skill in the art. In some embodiments, the counter ion may be the molecule itself, such as in the case of a zwitterionic surfactant. In some embodiments, the counter ion may be a proton, for example. In certain embodiments, the charged surfactant is nonpolymeric.

The charged surfactant comprises a weight average molecular weight ranging from about 100 Da to about 1,000 Da. In some embodiments, the weight average molecular weight ranges from about 100 Da to about 800 Da, from about 100 Da to about 600 Da, from about 300 Da to about 1,000 Da, or from about 500 Da to about 1,000 Da, for example.

In some embodiments, the weight ratio of surfactant to HNT is about 100:1 to about 1:100, such as about 1:1 to about 1:100. In some embodiments, the weight ratio is about 50:1 to about 1:100, about 20:1 to about 1:100, about 10:1 to about 1:100, about 1:5 to about 1:100, about 1:10 to about 1:100, about 1:30 to about 1:100, about 1:50 to about 1:100, about 1:70 to about 1:100, about 1:90 to about 1:100, about 1:1 to about 1:80, about 1:1 to about 1:60, about 1:1 to about 1:40, about 1:1 to about 1:20, about 1:1 to about 1:10, about 1:1 to about 1:8, about 1:1 to about 1:6, about 1:1 to about 1:4, or about 1:1 to about 1:2.

The lumen of the HNT also comprises a polymer. The polymer component functions as an asphaltene inhibitor. In some embodiments, the polymer prohibits the asphaltenes from sticking together while the surfactant prevents the polymer/asphaltene agglomerants from sticking to each other.

In certain embodiments, the polymer is nonionic. In some embodiments, the polymer comprises a monomer selected from the group consisting of isobutylene, butadiene, isoprene, ethylene, propylene, an acrylate, acrylamide, methacrylate, methacrylamide, and any combination thereof.

In some embodiments, the polymer is an alkyl phenol-formaldehyde polymer, an alkyl phenol-amine-formaldehyde polymer, a polyalkylene, a polyisobutylene succinic ester or a polyisobutylene succinimide.

In certain embodiments, the polymer comprises about 10 mole % to about 90 mole % of a nonylphenol and about 10 mole % to about 90 mole % of formaldehyde. For example, the polymer may comprise about 25 mole % to about 75 mole % of a nonylphenol and about 25 mole % to about 75 mole % of formaldehyde or the polymer may comprise about 40 mole % to about 60 mole % of a nonylphenol and about 40 mole % to about 60 mole % of formaldehyde. In some embodiments, the polymer is a polyisobutylene succinic anhydride pentaerythritol ester, a dinonylphenol-formaldehyde-nonylphenol polymer, or a 4-nonylphenol-formaldehyde-diethylenetriamine.

The polymer may optionally be selected from aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; amphoteric fatty acids; salts of alkyl succinates; and polyisobutylene succinic anhydride.

The molecular weight of the polymer is not particularly limited. In some embodiments, the polymer comprises a weight average molecular weight ranging from about 500 Da to about 500,000 Da. For example, the polymer may comprise a weight average molecular weight from about 500 Da to about 300,000 Da, from about 500 Da to about 200,000 Da, from about 500 Da to about 100,000 Da, from about 500 Da to about 90,000 Da, from about 500 Da to about 80,000 Da, from about 500 Da to about 70,000 Da, from about 500 Da to about 60,000 Da, from about 500 Da to about 50,000 Da, from about 500 Da to about 40,000 Da, from about 500 Da to about 30,000 Da, from about 500 Da to about 20,000 Da, or from about 500 Da to about 10,000 Da.

In some embodiments, the weight ratio of polymer to HNT is about 100:1 to about 1:100, such as about 1:1 to about 1:100. In some embodiments, the weight ratio is about 50:1 to about 1:100, about 20:1 to about 1:100, about 10:1 to about 1:100, about 1:5 to about 1:100, about 1:10 to about 1:100, about 1:30 to about 1:100, about 1:50 to about 1:100, about 1:70 to about 1:100, about 1:90 to about 1:100, about 1:1 to about 1:90, about 1:1 to about 1:70, about 1:1 to about 1:50, about 1:1 to about 1:30, about 1:1 to about 1:10, about 1:1 to about 1:8, about 1:1 to about 1:6, about 1:1 to about 1:4, or about 1:1 to about 1:2.

In some embodiments, the lumen of the HNT consists of the polymer and the charged surfactant or consists essentially of the polymer and the charged surfactant. In certain embodiments, the asphaltene inhibitor composition consists of the polymer and the charged surfactant or consists essentially of the polymer and the charged surfactant. In some embodiments, the asphaltene inhibitor composition consists of the polymer, the charged surfactant, wax, and a carrier solvent or consists essentially of the polymer, the charged surfactant, wax, and a carrier solvent. In certain embodiments, the carrier fluid consists of, or consists essentially of, the asphaltene inhibitor and in other embodiments, the carrier fluid consists of, or consists essentially of, the asphaltene inhibitor and an additive.

The asphaltene inhibitors disclosed herein may be formed by imbibition of a charged surfactant and a polymer into the lumen of a HNT. In some embodiments, the HNT is a purified HNT, wherein "purified" means that an ore or other earth extract or a product thereof is processed to preferentially collect the HNT and exclude other materials; and "purifying" a HNT means to conduct one or more such processes prior to using the purified HNT to form the asphaltene inhibitor. In any of the foregoing embodiments, imbibition is suitably accomplished by contacting the HNT with an imbibition solvent and the selected charged surfactant and polymer, resulting in formation of the asphaltene inhibitor.

Many reported examples are available describing imbibition of chemicals into a HNT lumen, such as International Patent Application Publication No. WO 00/52301; Cavallaro et al., *J. Phys. Chem. C* 2016, 120, 13492-13502; Nyankson et al., *Ind. Eng. Chem. Res.* [BIB]; and Owoseni et al., *Langmuir* 2014, 30, 13533-13541, the contents of which are incorporated by reference into the present application in their entirety.

In some embodiments, a HNT is imbibed by contacting the HNT with an imbibition solvent, a charged surfactant and a polymer. In any of the embodiments described herein, the charged surfactant, polymer or charged surfactant/polymer mixture may be dispersed in the imbibition solvent at any ratio that facilitates dispersion or dissolution, and mixing, of the HNT, the charged surfactant and the polymer. The imbibition solvent may be, for example, water, a solvent that is water-miscible, or a blend of water and one or more water-miscible solvents. In some embodiments, a charged surfactant, polymer, and/or a mixture thereof is dispersed in water, and water is the imbibition solvent. In other embodiments, the imbibition solvent is an aqueous solution of water and one or more water-miscible solvents. In some embodiments, a hydrotrope is included in the imbibition solvent to facilitate dispersion of HNT, charged surfactant, polymer, or any combination thereof. In some embodiments, the imbibition solvent may include one or more agents to adjust the pH of the imbibition solvent. In some embodiments, the imbibition solvent optionally comprises one or more additives disclosed herein.

In some embodiments, the solvent is recoverable by evaporation and may be re-used to disperse a fresh batch of surfactant/polymer for imbibition. Useful and non-limiting imbibition solvents include water, methanol, ethanol, acetone, methyl ethyl ketone, isopropanol, benzene, and toluene. Blends of these, further with other solvents and/or hydrotropes, are usefully employed as the imbibition solvent.

In some embodiments, the imbibing includes contacting the HNT with the charged surfactant and polymer dissolved or dispersed in the imbibition solvent. In certain embodiments, the contacting is accompanied by a reduced pressure. Reduced pressure means sub-atmospheric pressure, or pressure of less than 1 atm. Reducing pressure in the presence of dissolved or dispersed surfactant and/or polymer increases the rate of imbibition of surfactant and/or polymer by the HNT to form the asphaltene inhibitor.

In some embodiments, a first reduced pressure is applied to the combination of HNT, charged surfactant, polymer and imbibition solvent. In certain embodiments, the first reduced pressure is applied cyclically, wherein a period of reduced pressure is followed by a period of higher pressure. In some embodiments the higher pressure is atmospheric pressure, while in other embodiments, the higher pressure is a pressure between atmospheric pressure and the first reduced pressure. Thus, in embodiments, the imbibing may be accompanied by one, two, three, four, five, or more than five cycles of reduced pressure and as many as 100 or more cycles of reduced pressure. In some embodiments, the first reduced pressure is the same as the reduced pressure applied in subsequent cycles, while in other embodiments, the reduced pressure is variable between cycles. That is, in embodiments, the first reduced pressure, the higher pressure, or both may vary purposefully or incidentally over two or more cycles.

In some embodiments, including embodiments wherein a reduced pressure is applied, the imbibition is accompanied by a targeted temperature of about −40° C. to about 100° C., such as about 0° C. to about 100° C., or about 20° C. to about 100° C., or about 40° C. to about 100° C., or about 60° C. to about 100° C., or about 80° C. to about 100° C., or about −40° C. to about 90° C., or about −40° C. to about 70° C., or about −40° C. to about 50° C., or about −40° C. to about 30° C., or about −40° C. to about 10° C., or about −40° C. to about 0° C.

In some embodiments, the imbibition is continued for a period of about 1 minute to about 24 hours after contact of the HNT, imbibition solvent, polymer(s), charged surfactant(s), and optional additive(s). For example, the imbibition may be continued for about 10 minutes to about 24 hours, or about 30 minutes to about 24 hours, or about 1 hour to about 24 hours, or about 5 hours to about 24 hours, or about 10 hours to about 24 hours, or about 15 hours to about 24 hours, or about 1 minute to about 15 hours, or about 1 minute to about 5 hours, or about 1 minute to about 1 hour. The period is accompanied by 0 to 1000 cycles of a first reduced pressure to result in the formation of the asphaltene inhibitor.

In some embodiments, after imbibition is complete, the imbibition solvent is removed or is substantially removed from the asphaltene inhibitor by evaporation, optionally under reduced pressure and optionally by adding heat to the asphaltene inhibitor in the imbibition solvent. In some embodiments, the imbibition solvent is not removed after completion of imbibition. In such embodiments, the imbibition solvent is included as the carrier fluid, as part of the carrier fluid, or as part of the solvent in a subsequent step comprising adding wax to the asphaltene inhibitor composition.

After the asphaltene inhibitor is formed, and optionally after further removing a portion or all of the imbibition solvent, the asphaltene inhibitor may be contacted with a wax. In some embodiments, the asphaltene inhibitor includes a layer of wax disposed substantially on the outer or exterior surface of the nanotube. In certain embodiments, the wax layer extends at least partly across the first and second ends of the HNT nanotube lumen. In certain embodiments, the wax layer extends completely across the first and/or second ends of the HNT nanotube lumen, effectively sealing the first and/or second ends of the lumen and preventing the imbibed chemicals from exiting the lumen.

Waxes are hydrophobic compounds having melting points, or melting transition onsets, of over about 40° C., such as between about 40° C. and about 200° C., or between about 50° C. and about 170° C., or between about 60° C. and about 150° C., or between about 70° C. and about 120° C. "Hydrophobic" in this context means having solubility in water of less than 1 wt. % at 25° C. In embodiments, the wax is insoluble in water, wherein "insoluble in water" means less than 1 wt. % will dissolve in water at 20° C.

Illustrative, non-limiting examples of waxes for contacting the asphaltene inhibitor include paraffin wax, animal waxes, vegetable waxes, mineral waxes, synthetic waxes, bayberry wax, beeswax, carnauba wax, microcrystalline wax, petrolatum, stearyl dimethicone, stearyl trimethicone, ethylene-α-olefin copolymers, $C_{18}$-$C_{45}$ olefins, and ethylene or propylene oligomers and short chain homopolymers as well as copolymers thereof. In some embodiments, short chain polyolefin waxes of ethylene, propylene, or both, are formed using Fischer-Tropsch catalysts or other specialized catalysts in order to induce high density (over 0.95 g/cm$^3$), which in turn results from the high crystalline content in the solid wax.

Blends of two or more waxes are useful for adjusting solubility and/or melt transition properties of the wax layer deposited on the nanotube outer or exterior surface and therefore for customizing the wax layer to target a specific melting temperature, melt transition onset, or melting range of temperatures; or to target a specific solubility, or both. In the context of this application, "wax" or "wax blend" means one or more than one wax, in any proportion, present as a mixture thereof.

In some embodiments, the weight ratio of wax to the asphaltene inhibitor is about 10:1 to about 1:100, such as about 9:1 to about 1:100, or about 7:1 to about 1:100, or about 5:1 to about 1:100, or about 3:1 to about 1:100, or about 1:1 to about 1:100, or about 1:10 to about 1:100, or about 1:30 to about 1:100, or about 1:50 to about 1:100, or about 1:70 to about 1:100, or about 1:90 to about 1:100, or about 10:1 to about 1:90, or about 10:1 to about 1:70, or about 10:1 to about 1:50, or about 10:1 to about 1:30, or about 10:1 to about 1:10, or about 10:1 to about 1:1, or about 5:1 to about 1:5, or about 1:1 to about 1:50, or about 1:1 to about 1:10, or about 1:1 to about 1:5, or about 10:1 to about 20:1, or about 10:1 to about 40:1, or about 10:1 to about 60:1, or about 10:1 to about 80:1.

The asphaltene inhibitor is coated with a wax layer by contacting the structure with a wax dissolved or dispersed in a contacting solvent. Methods of coating wax onto the exterior surface of a nanotube include dispersing or dissolving the wax in a solvent that will not disperse or dissolve the charged surfactant or the polymer. In some embodiments, the solvent is recoverable by evaporation. Useful and non-limiting contacting solvents include $C_5$-$C_{12}$ alkanes, such as hexane, heptane, octane, benzene, and toluene. Blends of these, further with other solvents, are usefully employed as the contacting solvent.

In some embodiments, the contacting solvent includes at least one solvent that is also in the imbibition solvent. In some embodiments, the contacting includes fluidized bed contact of the asphaltene inhibitor with the wax, wherein the wax is molten (wax having a viscosity of less than 10 cP, often less than 2 cP) or dissolved in the contacting solvent. In some embodiments, the contacting is accompanied by a force in excess of gravity. Such contacting embodiments include the step of contacting the asphaltene inhibitor with the wax within a centrifuge or a hydrocyclone.

In some embodiments, the contacting is accompanied by a reduced pressure. Reduced pressure means sub-atmospheric pressure, or pressure of less than 1 atm. Reducing pressure in the presence of dissolved or dispersed wax increases the rate of layer deposition of wax on the asphaltene inhibitor.

In some embodiments, a first reduced pressure is applied to the combination of HNT, charged surfactant, polymer and imbibition solvent to form the HNT/polymer/charged surfactant structure. In some embodiments, a second reduced pressure is applied to the combination of contacting solvent, HNT/polymer/charged surfactant structure and wax. In some embodiments, the second reduced pressure is applied cyclically, wherein a period of reduced pressure is followed by a period of higher pressure. In some embodiments, the higher pressure is atmospheric pressure, while in other embodiments, the higher pressure is a pressure between atmospheric pressure and the second reduced pressure. Thus, in embodiments, the imbibing, the contacting, or both are accompanied by one, two, three, four, five, or more than five cycles of reduced pressure and as many as 100 or more cycles of reduced pressure or even 1000 or more cycles of reduced pressure. In some embodiments, the second reduced pressure is the same as the reduced pressure applied in subsequent cycles, while in other embodiments, the second reduced pressure is variable between cycles. That is, in embodiments, the second reduced pressure, the higher pressure, or both may vary purposefully or incidentally over two or more cycles.

In some embodiments, including embodiments wherein a reduced pressure is applied, the contacting is accompanied by a targeted temperature of about −40° C. to about 100° C., such as about 0° C. to about 100° C., or about 20° C. to about 100° C., or about 40° C. to about 100° C., or about 60° C. to about 100° C., or about 80° C. to about 100° C., or about −40° C. to about 90° C., or about −40° C. to about 70° C., or about −40° C. to about 50° C., or about −40° C. to about 30° C., or about −40° C. to about 10° C., or about −40° C. to about 0° C. In some embodiments, the contacting is continued for a period of about 1 minute to about 24 hours after contact of the asphaltene inhibitor, contact solvent, and wax, such as about 10 minutes to about 24 hours, or about 30 minutes to about 24 hours, or about 1 hour to about 24 hours, or about 5 hours to about 24 hours, or about 10 hours to about 24 hours, or about 15 hours to about 24 hours, or about 1 minute to about 15 hours, or about 1 minute to about 5 hours, or about 1 minute to about 1 hour. The period is accompanied by 0 to 1000 cycles of a second reduced pressure.

In some embodiments, after contacting is complete, the contacting solvent is removed or is substantially removed from the asphaltene inhibitor comprising wax by evaporation, optionally under reduced pressure and optionally by adding heat to the structure in the contacting solvent. In some embodiments, the contacting solvent is not removed after completion of contacting.

When at least a portion of the contacting solvent is evaporated, the evaporation is carried out at a temperature below a melting transition onset temperature of the wax. In some embodiments, evaporating is accomplished by adding heat, lowering a pressure to below atmospheric pressure, or both adding heat and lowering a pressure.

After the asphaltene inhibitor comprising the wax is formed, and optionally after further removing a portion or all of the contacting solvent, the structure may be added to a carrier fluid or it may be stored either as a dry particulate or as a dispersion in the contacting solvent, for example.

In some embodiments, a carrier fluid comprises the asphaltene inhibitor composition. For example, the asphaltene inhibitor composition may comprise an aqueous solution of HNT, polymer, charged surfactant, wax, and optionally an additive.

The carrier fluid for the asphaltene inhibitor may be aqueous or non-aqueous. Suitable non-aqueous carriers include alkanols, such as methanol or polyols (e.g., a glycol). In some embodiments, glycols include those of the formula $(CH_2)_n(OH)_2$ wherein n is 2 to 6 (e.g., ethylene glycol). Other suitable non-aqueous carriers include, but are not limited to, aldehydes, diesel, base oil (mineral oil), kerosene, heavy aromatic naptha, xylene, toluene, and petroleum distillates. Non-aqueous carriers may be used, for example, if the reservoir is water-sensitive.

Alternatively, the carrier fluid may be aqueous (e.g., sea water). The aqueous carrier fluid may comprise, for example, clean, filtered, produced brine, or brine prepared by adding inorganic salts, such as KCl or $NH_4Cl$, to water.

The asphaltene inhibitor may be combined with the carrier fluid using batch mixing. For example, a volume of brine may be contained in a tank and the asphaltene inhibitor, along with any additional additives, may be added to the tank and mixed into the brine. In some embodiments, the combination may be prepared by pumping brine from a source and injecting the asphaltene inhibitor, along with any additional additives, into the flowing brine. The asphaltene inhibitor and any additional additives may be mixed into the brine by means of a static mixer or other mechanical device before entering the wellbore.

The amount of asphaltene inhibitor in the carrier fluid may be from about 1 ppm to about 10,000 ppm. For example, the amount of asphaltene inhibitor in the carrier fluid may be from about 1 ppm to about 8,000 ppm, from about 1 ppm to about 6,000 ppm, from about 1 ppm to about 4,000 ppm, from about 1 ppm to about 2,000 ppm, from about 1 ppm to about 1,000 ppm, from about 1 ppm to about 500 ppm, from about 1,000 ppm to about 10,000 ppm, from about 3,000 ppm to about 10,000 ppm, from about 5,000 ppm to about 10,000 ppm or from about 7,000 ppm to about 10,000 ppm.

The amount of asphaltene inhibitor in the carrier fluid may be selected by one of ordinary skill in the art based on, for example, the type and amount of charged surfactant and the subterranean conditions known or expected, including temperature, rock composition, connate composition, and connate/hydrocarbon ratio. In some embodiments, the asphaltene inhibitor is insoluble in the carrier fluid. In certain embodiments, the asphaltene inhibitor is dispersed in the carrier fluid and does not disgorge the surfactant/polymer into the carrier fluid. In some embodiments, the carrier fluid may be at a temperature of about 20° C. to about 80° C. while it is combined with the asphaltene inhibitor.

The carrier fluid may include additional additives for subterranean injection. Illustrative, non-limiting examples of additives include viscosity modifiers, scale control agents, emulsion preventers, emulsifiers, solvents, oxygen scavengers, hydrogen sulfide scavengers, corrosion inhibitors, biocides, stabilizing agents, pH buffering agents, acidulants, friction reducers, defoaming agents, anti-redeposition agents, bleaching agents, solubility modifiers, dispersants, rinse aids, metal protecting agents, emulsion breakers, reverse emulsion breakers, emulsion stabilizers, iron dissolvers, chelating agents, peracid stabilizers, acids, antimicrobial agents, fragrances, dyes, rheology modifiers, hydrotropes, paraffin inhibitors, water clarifiers, hydrate inhibitors, and any combination thereof.

The amount of additive(s) in the carrier fluid is not particularly limited and may be selected by one of skill in the art. In some embodiments, the additive is present in an amount ranging from about 0.0001 wt. % to about 50 wt. %. For example, the additive may be present from about 0.001 wt. % to about 40 wt. %, about 0.001 wt. % to about 30 wt. %, from about 0.001 wt. % to about 20 wt. %, from about 0.01 wt. % to about 20 wt. % or from about 0.01 wt. % to about 10 wt. %. The additive(s) may additionally or alternatively be disposed in the lumen of the HNT.

The present disclosure also provides methods of controlling asphaltenes in a subterranean formation. The subterranean formation may comprise a hydrocarbon. In certain embodiments, the subterranean formation is an oil well or a gas well.

A method of controlling asphaltenes may include adding an asphaltene inhibitor to a subterranean formation. The asphaltene inhibitor is as defined herein. Typically, the asphaltene inhibitor is added through a wellbore and pumped into the subterranean formation.

In some embodiments, the asphaltene inhibitor is added as close to the reservoir as possible, such as at the wellhead or right before the wellhead choke. With this point of addition, the presently disclosed asphaltene inhibitors may protect the near wellbore region as well as all other regions along the pipeline to the separator.

In some embodiments, application of the asphaltene inhibitor occurs after an intervention or remediation job so the near wellbore region is as clean as possible. This could help improve adhesion of the asphaltene inhibitor to reservoir substrate.

In some embodiments, a carrier fluid comprises, consists of, or consists essentially of the asphaltene inhibitor.

If a step consists essentially of adding an asphaltene inhibitor, the step excludes adding compositions, compounds, chemicals, etc., that would materially affect the basic and novel characteristic(s) of the process, which include, in some embodiments, additional surfactants, such as nonionic surfactants, those used in enhanced oil recovery operations, and/or those not meeting the definitions for surfactant provided herein, additional polymers, such as those used in enhanced oil recovery operations and/or those not meeting the definitions for the polymers provided herein, carbon-based nanomaterials, and/or clay minerals. In certain embodiments, organosilanes, carbon-based nanomaterials, and/or clay minerals are not added to the subterranean formation while practicing the presently disclosed methods.

When the methods disclosed herein are carried out in connection with squeeze treatments, the asphaltene inhibitor may, but does not need to, be added in a preflush step. The asphaltene inhibitor may also be added in connection with the main pill and/or overflush steps. As used herein, the term "preflush" describes a step in which a reservoir is prepared to undergo treatment with at least an asphaltene inhibitor. The preflush step wets the surfaces within the formation. In some embodiments, the preflush step is carried out by injecting a carrier fluid comprising the asphaltene inhibitor into the subterranean reservoir.

As used herein, the term "main pill" describes a method step in which the subterranean formation is contacted with at least an asphaltene inhibitor. The term "overflush" describes a method step in which a fluid is introduced into the subterranean formation to push, force or displace the asphaltene inhibitor out of the wellbore and into the reservoir. This step is generally carried out because treatment chemicals are usually delivered to the wellbore and although some of the compositions will flow into the reservoir, the process is slow, especially in reservoirs having low permeability. The overflush step, however, creates pressure that forces the treatment chemical into the reservoir. The fluid pumped/injected during the preflush, overflush and/or main pill steps may be any solvent or carrier fluid disclosed herein, such as a brine.

In some embodiments, after the asphaltene inhibitor is delivered to the reservoir, the reservoir may be shut-in for some period of time, such as about 1 hour to about 48 hours, before production resumes.

In some embodiments, the methods disclosed herein enable the contact of subterranean environments with charged surfactants and polymers when a triggering condition is present. Triggering conditions are those that result in removal of wax from the asphaltene inhibitor. Such conditions may result in removal of the wax from the first and/or second ends of the nanotube lumen and serve as a triggering mechanism to disgorge surfactant and polymer from the lumen of the nanotube. These conditions may include contacting the asphaltene inhibitor with crude oil, or contacting the asphaltene inhibitor with a subterranean temperature that exceeds a melt transition temperature of the wax disposed on the asphaltene inhibitor.

In the case of contacting the asphaltene inhibitor with crude oil, the crude oil includes hydrocarbon compounds that dissolve the wax, including the wax residing at or extending across the first and second ends of the nanotube lumen. At least a portion of the imbibed surfactant and polymer is released from the lumen upon dissolution of the wax, and the surfactant and polymer may disperse into the crude oil.

It is known that subterranean temperatures can reach as high as about 170° C. Thus, even without contacting any hydrocarbon, the asphaltene inhibitor may be subjected to wax-melting temperatures, and the wax residing at or extending across the first and second ends of the nanotube lumen will similarly melt at or above a target temperature. At least a portion of the imbibed surfactant and polymer is released from the lumen upon melting of the wax, and the surfactant and polymer may disperse into the subterranean reservoir. The polymer and surfactant may slowly leach out of the lumen of the nanotube, thereby providing a slow or delayed release of the components.

Examples

Asphaltenes are inherently unstable when mixed with various n-alkanes. If a sample comprising asphaltenes is mixed with an n-alkane, the asphaltenes will precipitate.

With this in mind, crude oil samples dosed with asphaltene control chemicals alone or a HNT comprising asphaltene control chemicals were placed into test cells. n-Heptane was added to the test cells to make a 20% v/v solution, which was vortexed for about 10 seconds and inserted into a LUMi-Fuge® machine. Stability was measured by NIR light transmission at a temperature of about 25° C. and a speed of about 500 rpm over the course of about an hour. The higher the final transmittance number, the more unstable the solution. Conversely, samples with the lowest instability number are considered more stable.

Figure 1:
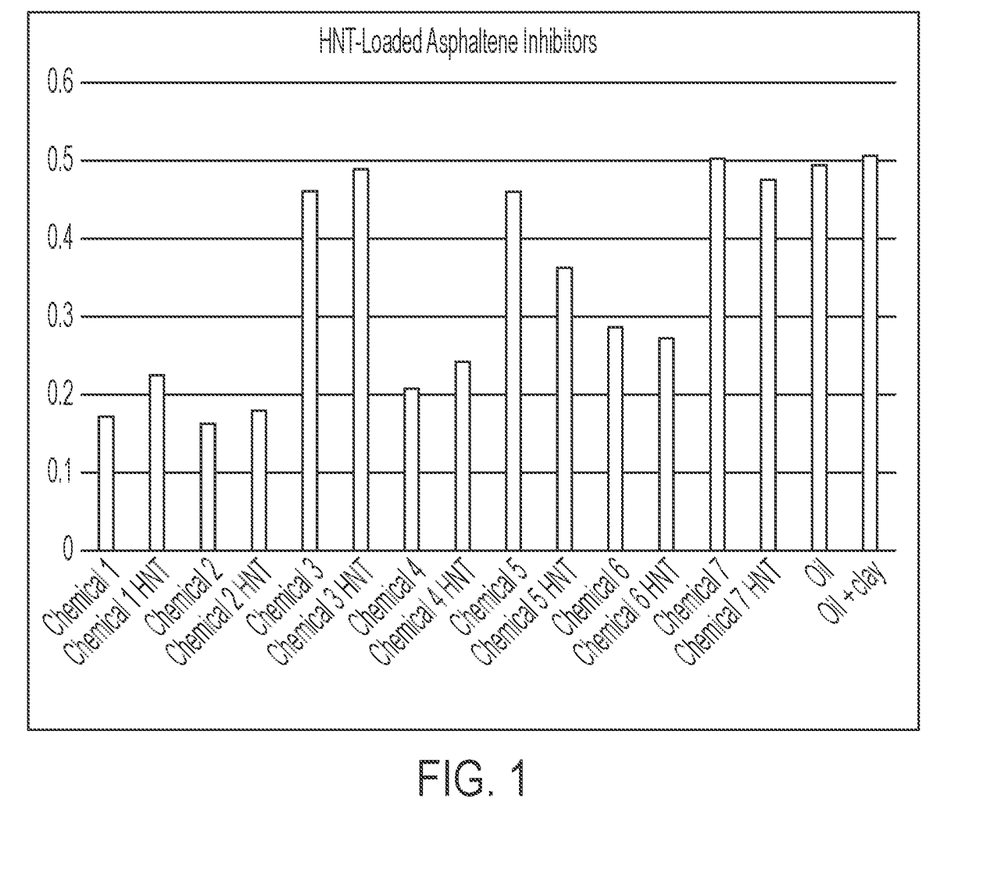
FIG. 1 shows the results of a LUMiFuge® instability index experiment conducted with certain asphaltene inhibitors.

In FIG. 1, the control chemicals are defined as follows:
Chemical 1: dinonylphenol-formaldehyde-nonylphenol copolymer, tall oil diethylenetriamine imidazoline, 2-ethylhexanol, and an aromatic solvent.
Chemical 2: dinonylphenol-formaldehyde-nonylphenol copolymer, tall oil diethylenetriamine imidazoline, tall oil fatty acids, reaction products of diethylenetriamine and acrylic acid, oleyamine, aromatic solvent, and an alcoholic solvent.
Chemical 3: diethylenetriamine imidazoline tall oil fatty acids, reaction products of diethylenetriamine and acrylic acid, and an aromatic solvent.
Chemical 4: 4-nonylphenol-formaldehyde-diethylenetriamine, dinonylphenol-formaldehyde-nonylphenol copolymer, and an aromatic solvent.
Chemical 5: polyisobutylene succinic anhydride pentaerythritol ester, phosphoric acid 2-ethylhexyl ester, reaction products of diethylenetriamine and acrylic acid, sulfurized decene, and an aromatic solvent.
Chemical 6: dinonylphenol-formaldehyde-nonylphenol copolymer and an aromatic solvent.
Chemical 7: polyisobutylene succinic anhydride pentaerythritol ester, phosphoric acid 2-ethylhexyl ester, reaction products of diethylenetriamine and acrylic acid, sulfurized decene, and an aromatic solvent.

As can be seen in FIG. 1, the chemicals performed about the same whether they were alone or disposed in the lumen of the HNT. The chemical providing the worst performance, Chemical 3, did not include the polymer component. Although this experiment was not directed at the slow-release aspects of the present disclosure, it showed that the HNT does not have a meaningful detrimental effect on the asphaltene control chemistry.

If FIG. 1 appears to show better performance with the control chemicals only as opposed to HNT comprising the control chemicals, it could be due to the fact that the chemicals for the experiments were all added on the same weight basis. A particular weight of control chemicals was added in the control chemical only sample and that same overall weight of chemical was used for the control chemicals plus HNT sample. Since the HNT itself was part of the overall weight calculation, the sample comprising the HNT actually had slightly less control chemicals.

Figure 2:
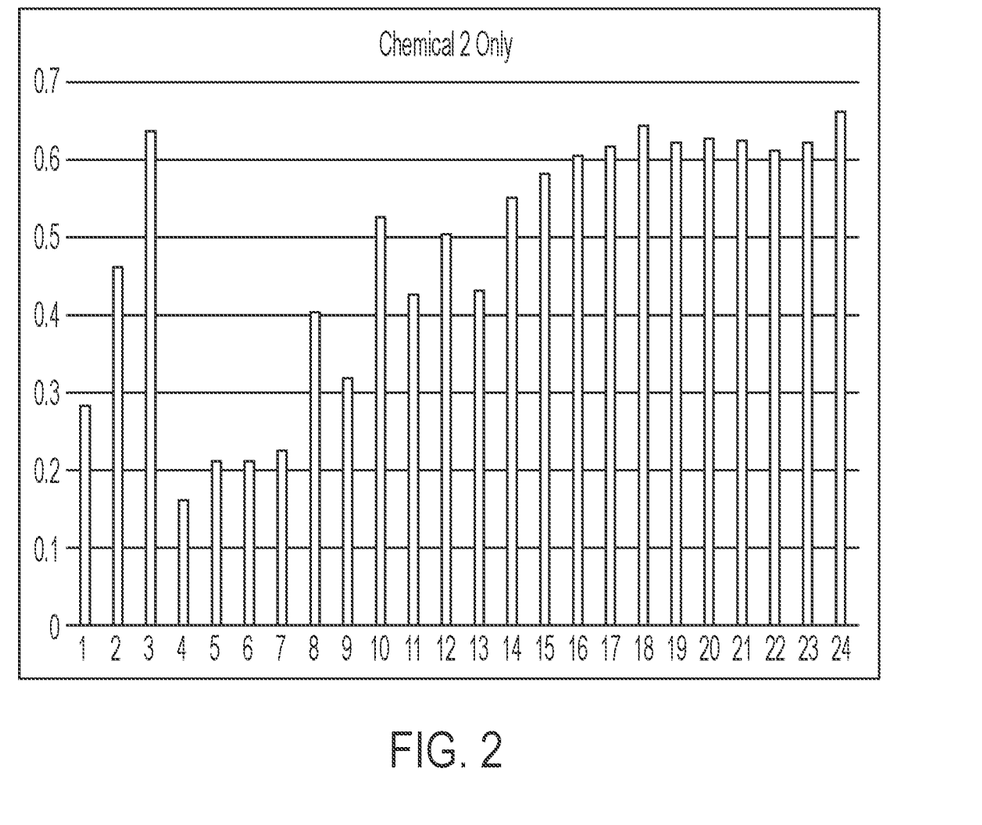
FIGS. 2 and 3 show the results of slow-release versus non-slow-release experiments conducted with an asphaltene inhibitor composition.
Figure 3:
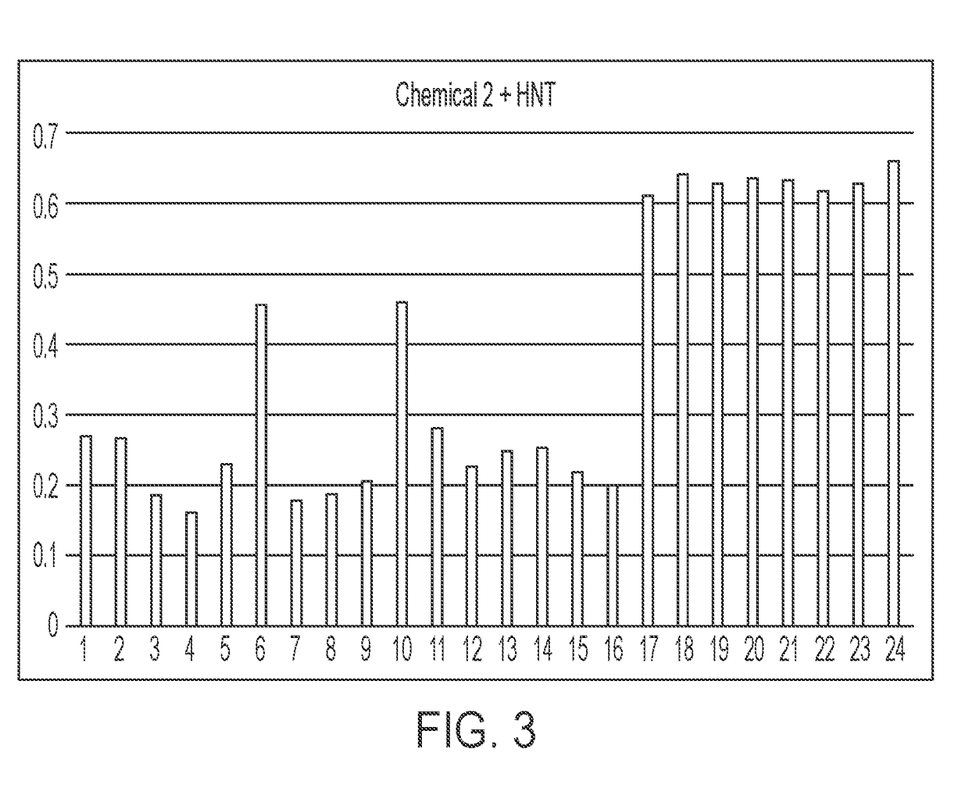

FIGS. 2 and 3 depict results from an experiment focused on the slow-release of the asphaltene control chemicals from the lumen of a HNT. Chemical 2 was selected for this experiment. In one trial, Chemical 2 was loaded by itself onto a ground polytetrafluoroethylene (PTFE) powder. The powder was packed into a tube and about 24 mL of oil was flushed through the tube one mL at a time. After each mL was added, a measurement was taken. As can be seen in FIG. 2, asphaltene inhibition began while the fourth mL of oil was added. Very quickly thereafter, the asphaltene inhibition performance began to significantly weaken because the asphaltene control chemicals were being transported out of the tube with the oil. To prove that the present technology provides slow-release of the asphaltene control chemicals, the same experiment was conducted but this time, Chemical 2 was disposed in the lumen of a HNT. As can be seen in FIG. 3, the asphaltene inhibition is sustained from about the first mL of oil until about the sixteenth mL of oil. In contrast to FIG. 2, the asphaltene inhibitor remained in the tube for a much longer period of time in FIG. 3 because of the slow-release effect of the HNT.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a polymer" is intended to include "at least one polymer" or "one or more polymers."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Any composition disclosed herein may comprise, consist of, or consist essentially of any element, component and/or ingredient disclosed herein or any combination of two or more of the elements, components or ingredients disclosed herein.

Any method disclosed herein may comprise, consist of, or consist essentially of any method step disclosed herein or any combination of two or more of the method steps disclosed herein.

The transitional phrase "comprising," which is synonymous with "including," "containing," or "characterized by," is inclusive or open-ended and does not exclude additional, un-recited elements, components, ingredients and/or method steps.

The transitional phrase "consisting of" excludes any element, component, ingredient, and/or method step not specified in the claim.

The transitional phrase "consisting essentially of" limits the scope of a claim to the specified elements, components, ingredients and/or steps, as well as those that do not materially affect the basic and novel characteristic(s) of the claimed invention.

Unless specified otherwise, all molecular weights referred to herein are weight average molecular weights.

As used herein, the term "about" refers to the cited value being within the errors arising from the standard deviation found in their respective testing measurements, and if those errors cannot be determined, then "about" may refer to, for example, within 5% of the cited value.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of controlling asphaltenes, comprising:
adding an asphaltene inhibitor to a subterranean formation, wherein the asphaltene inhibitor comprises a halloysite nanotube (HNT), the HNT comprising a lumen, wherein the lumen of the HNT comprises a polymer and a charged surfactant, the charged surfactant comprising an amine and/or amide group.

2. The method of claim 1, wherein the charged surfactant comprises a weight average molecular weight ranging from about 100 Da to about 1,000 Da.

3. The method of claim 1, wherein the charged surfactant comprises an imidazoline or an imidazolinium.

4. The method of claim 1, wherein the charged surfactant comprises a member selected from the group consisting of diethylene triamine (DETA)/tall oil fatty acid (TOFA)-imidazoline, DETA/TOFA-imidazoline acrylate, DETA/TOFA-imidazolinium, DETA/TOFA-imidazolinium acrylate, and any combination thereof.

5. The method of claim 1, wherein the charged surfactant comprises a member selected from the group consisting of and any combination thereof.

6. The method of claim 1, wherein the charged surfactant is nonpolymeric.

7. The method of claim 1, wherein the polymer is nonionic.

8. The method of claim 1, wherein the polymer comprises a weight average molecular weight ranging from about 500 Da to about 500,000 Da.

9. The method of claim 1, wherein the polymer comprises a monomer selected from the group consisting of isobutylene, butadiene, isoprene, ethylene, propylene, an acrylate, acrylamide, methacrylate, methacrylamide, and any combination thereof.

10. The method of claim 1, wherein the polymer is an alkyl phenol-formaldehyde polymer, an alkyl phenol-amine-formaldehyde polymer, a polyalkylene, a polyisobutylene succinic ester or a polyisobutylene succinimide.

11. The method of claim 1, wherein the polymer comprises about 10 mole % to about 90 mole % of a nonylphenol and about 10 mole % to about 90 mole % of formaldehyde.

12. The method of claim 1, wherein the polymer is a polyisobutylene succinic anhydride pentaerythritol ester, a dinonylphenol-formaldehyde-nonylphenol polymer, or a 4-nonylphenol-formaldehyde-diethylenetriamine.

13. The method of claim 1, wherein the charged surfactant is an anionic surfactant, a cationic surfactant, an amphoteric surfactant, a zwitterionic surfactant, or any combination thereof.

14. A composition, comprising:
(a) a HNT having an outer surface and an inner surface defining a lumen, the lumen comprising a first end and a second end,
(b) a surfactant disposed within the lumen, wherein the surfactant is a charged surfactant comprising an amine and/or amide group, and
(c) a polymer disposed within the lumen.

15. The composition of claim 14, wherein the lumen consists of, or consists essentially of, the surfactant and the polymer.

16. The composition of claim 14, wherein the charged surfactant comprises a weight average molecular weight ranging from about 100 Da to about 1,000 Da.

17. The composition of claim 14, wherein the charged surfactant comprises an imidazoline or an imidazolinium.

18. The composition of claim 14, wherein the charged surfactant comprises a member selected from the group consisting of diethylene triamine (DETA)/tall oil fatty acid (TOFA)-imidazoline, DETA/TOFA-imidazoline acrylate, DETA/TOFA-imidazolinium, DETA/TOFA-imidazolinium acrylate, and any combination thereof.

19. A method of controlling asphaltenes in a subterranean formation, comprising:
preflushing the subterranean formation with an aqueous solution,
delivering an asphaltene inhibitor to a wellbore of the subterranean formation, wherein the asphaltene inhibitor comprises a HNT, the HNT comprising a lumen including a polymer and a charged surfactant,
transporting the asphaltene inhibitor to a surface within the subterranean formation, and
controlling asphaltenes in the subterranean formation.

20. The method of claim 19, wherein the aqueous solution comprises the asphaltene inhibitor.

* * * * *